(12) United States Patent
Hellmich

(10) Patent No.: US 6,357,416 B1
(45) Date of Patent: Mar. 19, 2002

(54) PROCESS FOR CONTROLLING THE IGNITION POINT IN INTERNAL COMBUSTION ENGINES

(75) Inventor: Wolfram Hellmich, Munich (DE)

(73) Assignee: FICHT GmbH Co. KG, Kirchseeon (DE)

(*) Notice: Subject to any disclaimer, the term of this patent is extended or adjusted under 35 U.S.C. 154(b) by 0 days.

(21) Appl. No.: 09/011,079

(22) PCT Filed: Jun. 21, 1996

(86) PCT No.: PCT/EP96/02711

§ 371 Date: Aug. 18, 2000

§ 102(e) Date: Aug. 18, 2000

(87) PCT Pub. No.: WO97/05379

PCT Pub. Date: Feb. 13, 1997

(30) Foreign Application Priority Data

Jul. 27, 1995 (DE) .......................... 195 27 550

(51) Int. Cl.⁷ .................. F02B 3/02; F02P 5/04
(52) U.S. Cl. ............ 123/305; 123/295; 123/73 C
(58) Field of Search .................. 123/305, 295, 123/299, 300, 304, 73 C, 73 A

(56) References Cited

U.S. PATENT DOCUMENTS

| 4,123,997 A | * | 11/1978 | Oswald et al. ............... 123/1 A |
| 4,208,995 A | * | 6/1980 | Simko et al. ........... 123/406.48 |
| 4,428,346 A | * | 1/1984 | Hoshi ........................... 123/450 |
| 4,838,213 A | * | 6/1989 | Gerace ...................... 123/27 R |
| 4,883,032 A | * | 11/1989 | Hunter et al. ................ 123/256 |
| 5,711,270 A | * | 1/1998 | Pederson ..................... 123/304 |
| 5,960,766 A | * | 10/1999 | Hellmich ..................... 123/295 |
| 5,999,548 A | * | 12/1999 | Hellmich ..................... 123/295 |

* cited by examiner

Primary Examiner—John Kwon
Assistant Examiner—Hieu T. Vo
(74) Attorney, Agent, or Firm—Fletcher, Yoder & Van Someren

(57) ABSTRACT

A process for controlling the ignition in an internal combustion engine with a device for injecting fuel into a combustion chamber of the engine is provided, in which a control signal for the injection process and a control signal for the ignition process are used. The control signal for the injection process is used to start the measurement of a predetermined delay for the issue of the ignition control signal, as well as for the speed or load dependent switching to the ignition through the measurement of the crankshaft angle.

13 Claims, 5 Drawing Sheets

PROCESS FOR CONTROLLING THE IGNITION POINT IN INTERNAL COMBUSTION ENGINES

Figure 1:
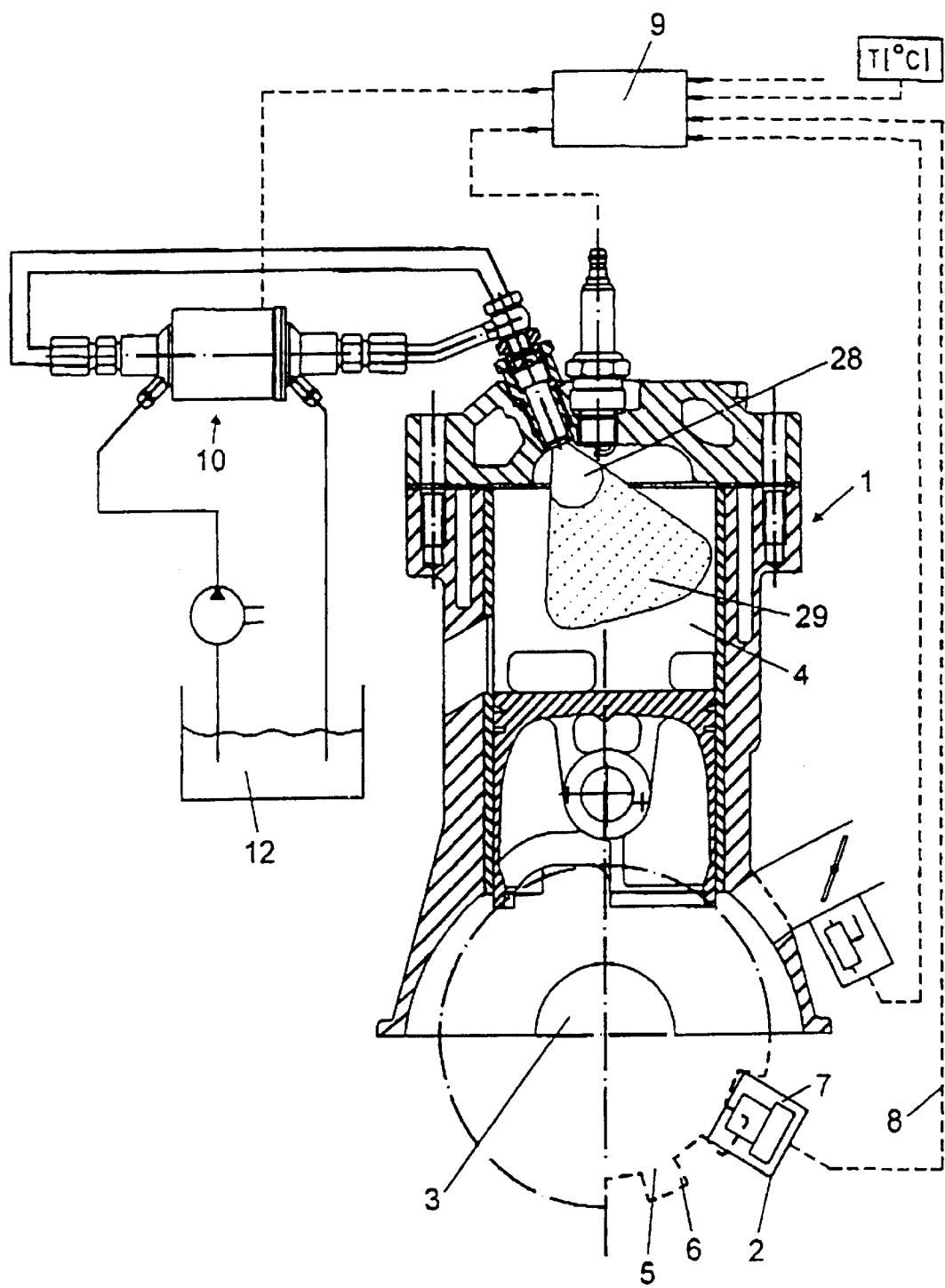

The invention relates to a method for controlling the ignition time in internal combustion engines.

Modern internal combustion engines 1 (FIG. 1) have electronic ignition systems which use a crankshaft angle sensor 2 to measure the angular position of a crankshaft 3 with regard to the upper dead center of the piston. These ignition systems determine the ignition time by means of a predetermined angular position of the crankshaft, i.e. ignition of a fuel/air mixture which has previously been fed into the combustion space 4 is triggered at the predetermined angular position. These ignition systems are as a rule a component of an electronic control device of the internal combustion engine which also controls the feeding in of the fuel/air mixture which is fed to the combustion space 4 at an "earlier" or preliminary angular position.

In intake engines and conventional low-pressure injection devices, the time period which is necessary for feeding in the fuel/air mixture corresponds to a considerable crank angle range. The time for the feeding in of the mixture is triggered, as is the ignition time, at a predetermined angular position of the crankshaft, but in simple control devices the time of the start of the feeding in of the mixture is not determined as precisely as the ignition time, since it is assumed that the combustion is influenced essentially by the ignition time and, owing to the long period of feeding in fuel, it is not necessary to determine precisely the start of the feeding in of fuel.

In internal combustion engines 1 having an injection device 10, it is customary to use a single control de vice 9 to control both the injection process and the ignition time. In high-pressure injection devices, the fuel, or the fuel/air mixture, is fed to the combustion space 4 in significantly shorter time ranges so that, when such high-pressure injection devices are used, in particular with a direct injection of the fuel into the combustion space 4, the time of the injection process, tog is determined precisely and is triggered at a predetermined angular position of the crankshaft. The precise measurement of the angular position of the crankshaft, both for the injection process and for the injection time, constitutes a considerable computational outlay for the control device 9, the measurement process having to be carried out twice within a very short time.

High-pressure injection devices which operate according to the energy storage principle are known, for example, from WO 92/14925 and WO 93/18296. These high-pressure injection devices are used to inject the fuel into the combustion space in very short pulses. In addition, there are high-pressure injection devices which operate according to the solid-state energy storage principle, so-called "PNS (pump/nozzle systems) injection devices" which are described, for example, in the German Patent applications P 195 15 781 and P 195 15 782. These PNS injection devices are provided in particular for directly injecting the fuel into the combustion space, it being possible for the time period for an injection process during idling to be shorter than half a millisecond. The crankshaft angle sensor 2 which is used for measuring the angular position of the crankshaft is composed of a toothed disk 5 with teeth 6 arranged on the circumference, and a sensor element 7 which is arranged at the circumferential region of the toothed disk 5 and senses the passing through of the teeth 6 and converts it into an appropriate electrical pulse signal. The electrical signal is fed to the control device 9 with a line 8. At high rotational speeds, the signal of the crankshaft angle sensor 2 has a high time resolution since the time intervals between the passing through of two successive teeth 6 at the sensor element 7 are very short. On the other hand, these time intervals are long at low rotational speeds (for example <2000 rpm), such as occur during idling, so that the measurement of the rotational speed becomes imprecise, in particular if the rotational speed changes during the measurement, since a change in the rotational speed between the passing through of two successive teeth 6 cannot be sensed precisely using the crankshaft angle sensor 2. Such changes in rotational speed occur, for example, during unsmooth idling, so that the measuring errors in the measured rotational speed do not yet solve in an optimum way the problem of the correction to an idling desired-rotational-speed. The measuring errors cause high fuel consumption resulting in relatively high emission of pollutants.

Figure 2:
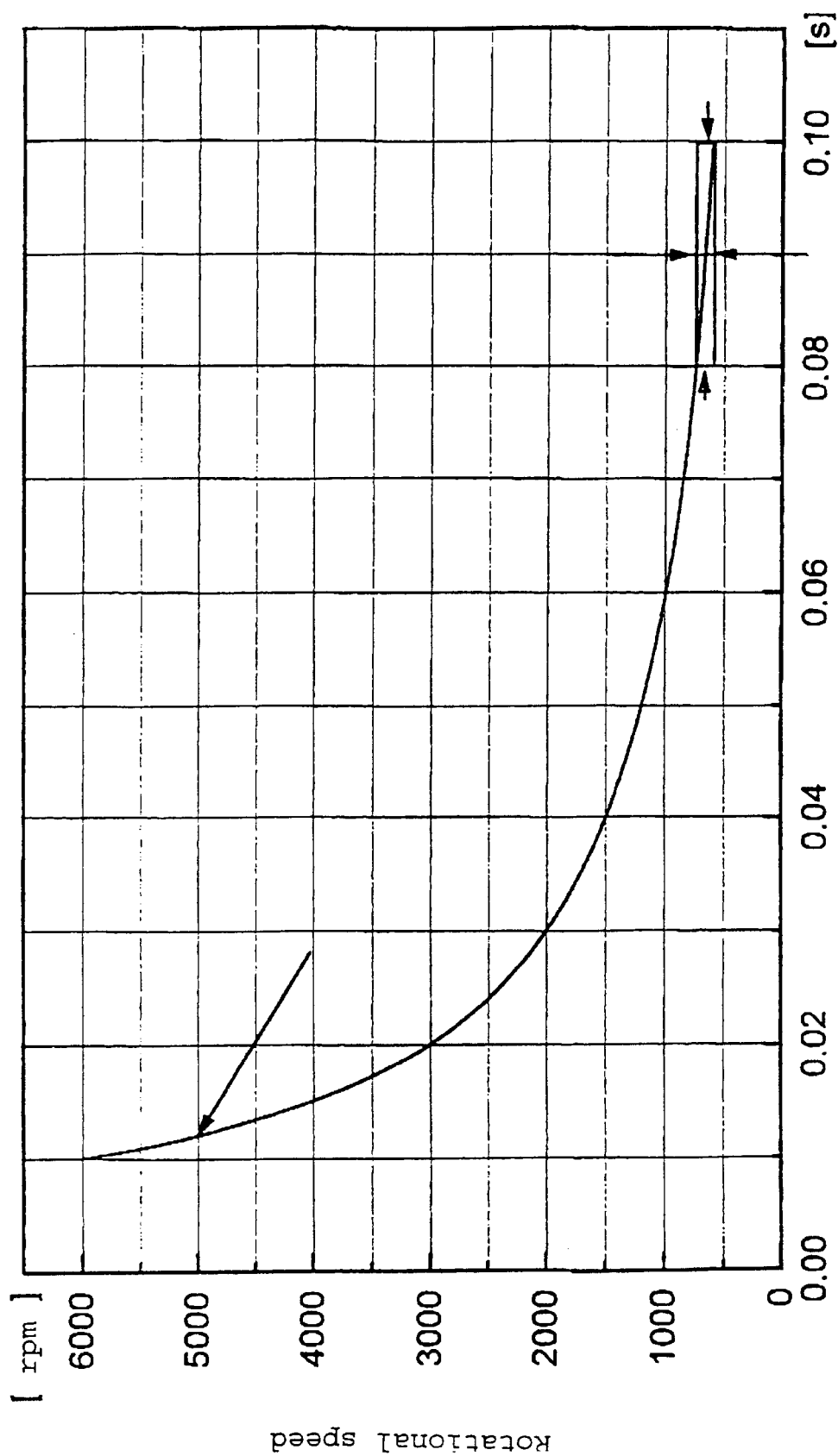

FIG. 2 shows the rotational speed of an internal combustion engine [rpm] over the time period of one crankshaft revolution [s]. It emerges from this that at low speeds changes in the rotational speed bring about a large change in the revolution time and thus great inaccuracies in the measurement of the rotational speed and large measuring time errors.

U.S. Pat. No. 3,892,207 discloses an internal combustion engine which has a control device for driving the injection process and the ignition by means of a single signal source. This control device controls the injection and the ignition with a constant timing ratio independently of the engine speed. The start of the injection and of the ignition are separated by a predetermined time interval which is measured by a time delay device which operates independently of the engine speed. This method for determining the ignition time is applied over the entire rotational speed range and it should be possible to apply it even in internal combustion engines which have higher rotational speeds than those of motor vehicles.

U.S. Pat. No. 4,621,599 discloses a method for injecting a quantity of fuel into a combustion space of an internal combustion engine and igniting it, in which method in each case a predetermined quantity of fuel for ignition is injected into the combustion space at a specific angular position of the upper dead center, and this quantity for ignition is ignited at the same time or with a specific delay. An additional quantity of fuel is injected with a time interval with respect to the quantity for ignition, which quantity is somewhat reduced in the case of a low load. In the case of a relatively large load, an additional quantity of fuel is injected in advance of the upper dead center by a specific angular position. As a result of the provision of a plurality of injection pulses, the injection method is very complex in its configuration and requires considerable control expenditure.

The invention is based on the object of providing a method for controlling the ignition in internal combustion engines, which method can be implemented with simple means and yet can be applied over the entire rotational speed range of the internal combustion engine, brings about a high degree of smooth running particularly at low rotational speeds, especially when idling, gives rise to a very good level of efficiency and considerably reduces the emission of pollutants.

The object is achieved by means of a method having the features of claim 1. Advantageous refinements are defined in the subclaims.

According to the invention, the ignition time is triggered below a predetermined load threshold or rotational speed threshold if a predetermined time period has passed since the triggering of the injection process. In order to carry out the ignition, it is not the angular position of the crankshaft in the region below the predetermined load threshold or rotational speed threshold which is measured, but rather the expiry of a predetermined time period since the triggering of the injection process. This ensures that at the ignition time the fed-in fuel/air mixture is in a predetermined state in which it can easily be ignited. The measuring inaccuracies occurring at low rotational speeds (<2000 rpm) when the ignition time is being determined as a function of the crankshaft position are avoided, since the ignition time is specified only as a function of the injection process so that very smooth idling is achieved.

Above the load threshold or rotational speed threshold the ignition time is determined in a manner known per se by measuring a predetermined angular position of the crankshaft, as a result of which a specific relationship between the crankshaft angle of the upper dead center and the ignition angle can be maintained precisely in a simple way.

The method according to the invention can be implemented using very simple technical means and achieves sensational synchronism in idling mode so that a two-stroke internal combustion engine can idle smoothly even at a rotational speed of 180 rpm.

The method according to the invention can be applied in all internal combustion engines having injection devices in which the fuel, or the fuel/air mixture, is fed to the combustion space with a predetermined time sequence, i.e. the injection process is a time-invariant process, the time period of which depends only on a few parameters, for example the quantity of fuel injected per injection process.

Figure 3:
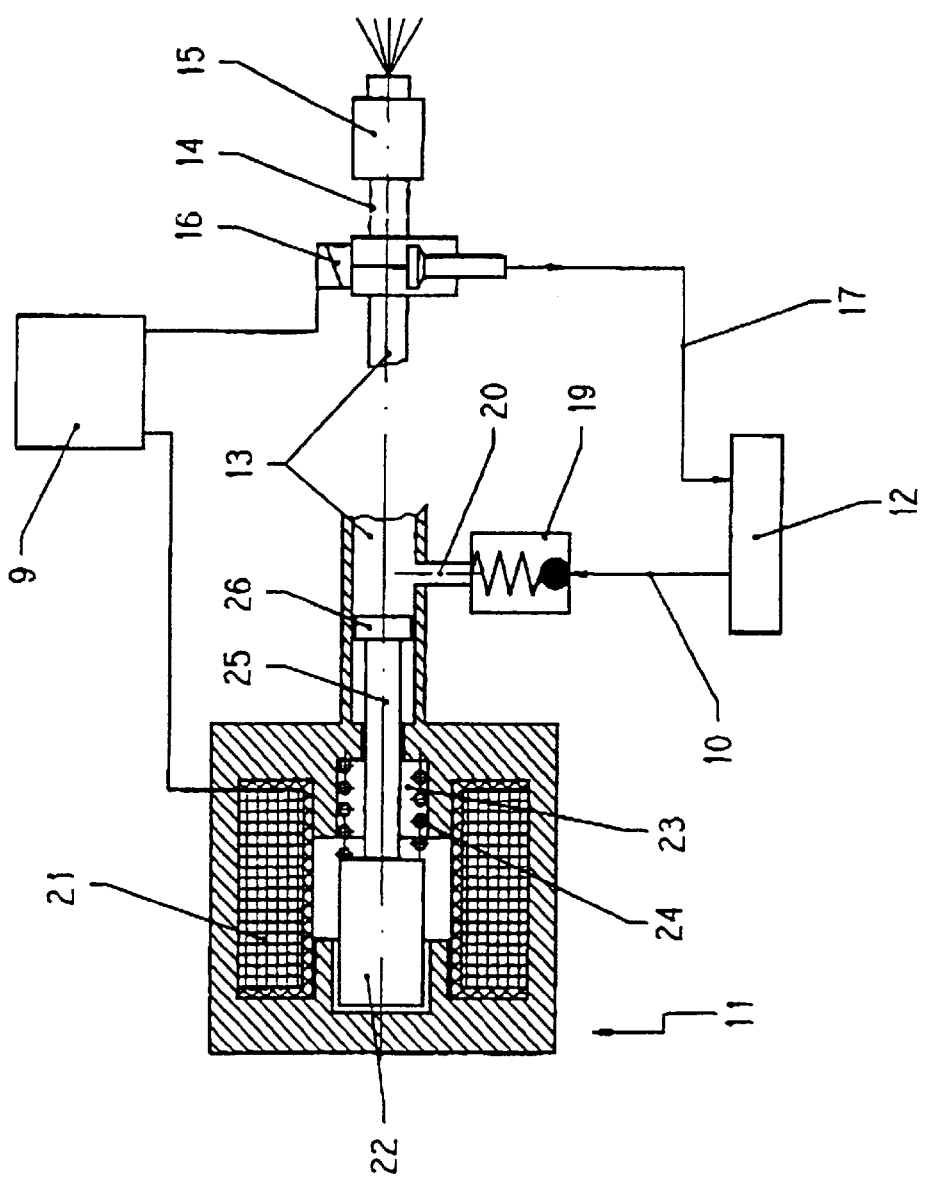
Figure 4:
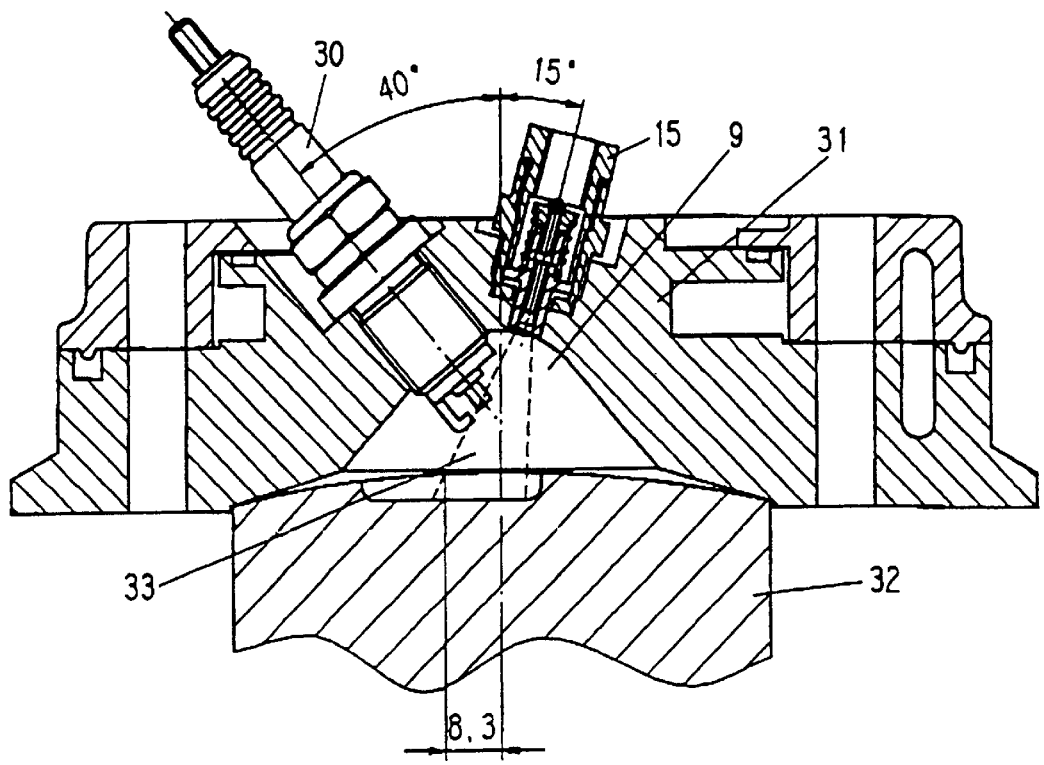
Figure 5:
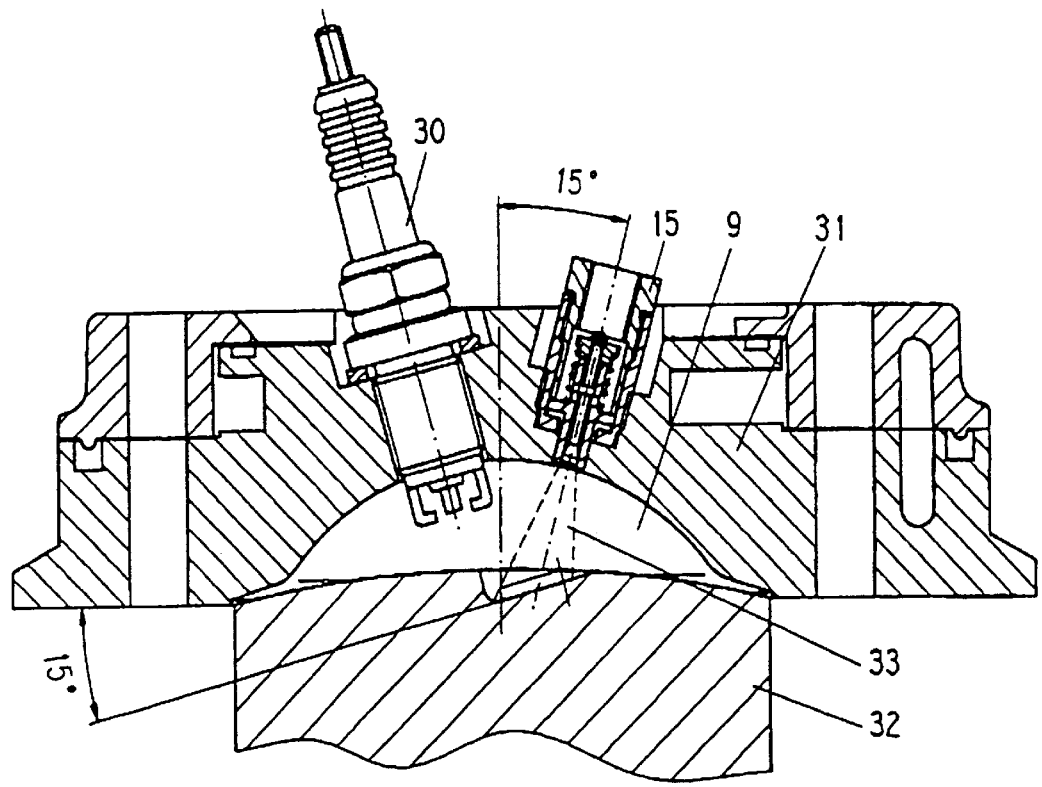
Figure 6:
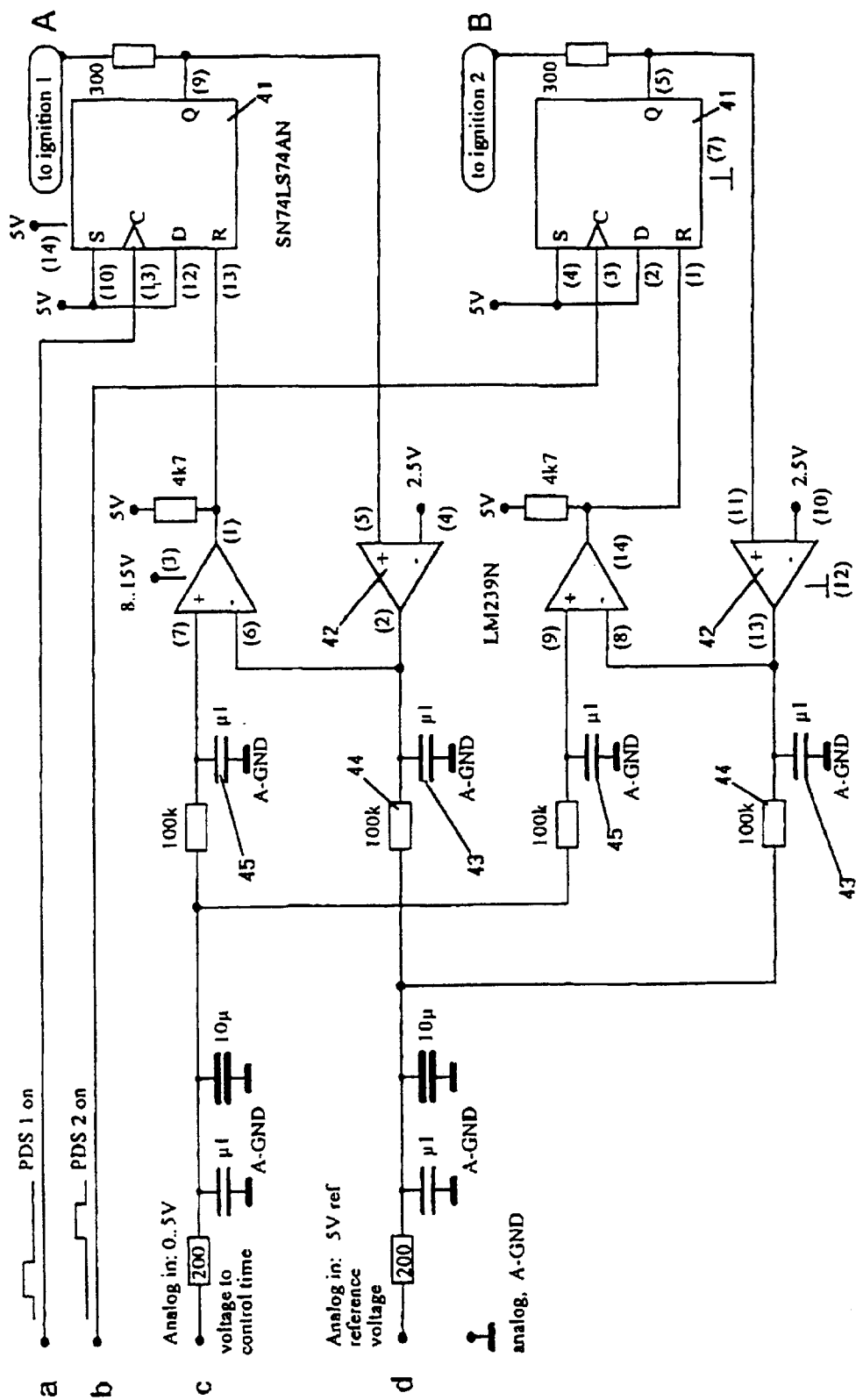

The invention is explained by way of example below with reference to the drawing, in which:

FIG. 1 is a schematic view of a cross section of a cylinder of an internal combustion engine having ignition and injection devices, FIG. 2 shows the relationship between the rotational speed [rpm] and the crankshaft revolution time [s] in a diagram, FIG. 3 is a schematic view of an injection device operating according to the energy storage principle, FIG. 4 is a cross section through a cylinder head and an upper region of a piston which are designed for a direct injection and a direct ignition of the fuel, FIG. 5 shows a cross section through a cylinder head and an upper region of a piston which are designed for a direct injection of the fuel, FIG. 6 shows a circuit which is used as a timer element for measuring the predetermined delay time.

The method according to the invention has been applied to a two-stroke internal combustion engine with two cylinders. The cubic capacity of this internal combustion engine is 380 cm$^3$ and the power is 60 PS at 6500 rpm.

The injection device used is an injection (PNS) device operating according to the solid-state energy storage principle, such as is described for example in the German Patent Applications P 195 15 781 and P 195 15 782.

The basic principle of an injection device operating according to the energy storage principle is illustrated schematically in FIG. 3. This fuel injection device is based on a piston pump 11 with electromagnetic drive for sucking in fuel from a reservoir vessel 12 and for accelerating the sucked-in fuel in a ram pipe 13, which is connected via a pressure line 14 to an injection nozzle 15. In addition, a shut-off valve 16 is arranged in a branch between the ram pipe 13 and the pressure line 14, said shut-off valve 16 being designed as an electromagnetic valve and controlling the passage of fuel to a return line 17 which is connected to the shut-off valve 16 and opens into the reservoir vessel 12. The shut-off valve 16 and the piston pump 11 are driven via the common electronic control device 9 which is connected to the exciter coil of the shut-off valve 16, which is designed as a solenoid valve, and to a coil of the drive solenoid of the piston pump 11. In addition, a nonreturn valve 19 is arranged in an intake line 20 which connects the pump-side end of the ram pipe 13 to the reservoir vessel 12.

The piston pump 11 comprises a solenoid pump 21 having an armature 22 which is arranged in the coil passage and is designed as a cylindrical body, for example as a solid body, and is guided in a housing hole 23 which extends parallel to the central longitudinal axis of the solenoid 21 and is prestressed into a position of rest by means of a compression spring 24, in which position of rest it bears, in FIG. 3, with its rear end wall against the left-hand end of the housing hole 23. The other end wall of the armature 22 is acted on by the spring 24 which is supported on the right-hand end of the hole 23 on the housing wall of the pump 11. The spring-loaded end side of the armature 22 is permanently connected to a piston rod 25, to whose free end a piston 26, the delivery piston of the pump 11, is attached, which piston is guided on the inner wall of the ram pipe 13 and is preferably sealed with respect to this wall. The piston rod 25 penetrates a hole in the pump housing, the diameter of which hole is smaller than the diameter of the hole guiding the armature 22.

The intake line 20 opens into the ram pipe 13 in front of the end face of the delivery piston 26 which is located on the outside. The nonreturn valve 19 in the feed line 20 comprises, for example, a spring-prestressed sphere as a valve element, the sphere and spring being arranged in such a way that the spherical valve element in the nonreturn valve is lifted off when the delivery piston 26 executes its intake stroke in order to suck in fuel from the vessel 12, that is to say when the piston 26 in FIG. 3 executes a stroke movement to the left, which is the case when the magnet 21 is deenergized and the armature 22 is moved into its position of rest by the spring 24. In the other cases namely during the delivery stroke of the piston 26, corresponding to a piston movement in FIG. 3 to the right with the solenoid 21 excited, the valve element of the nonreturn valve 20 is moved into its blocking position, so that the connection of the ram pipe 13 to the reservoir vessel 12 is interrupted. The delivery stroke of the piston 26 causes the mass of the fuel located in the ram pipe 13 to be accelerated and moved, during an opening time period of the shut-off valve 16 which is prescribed by the control device 18, into the return line 17 and via it into the vessel 12. During this time period, the fuel in the lines 13 and 17 is therefore primarily accelerated, and the fuel pressure in this context is so low that the nozzle 15 which is blocked in a manner known per se, for example hydraulically, assumes a blocking state in which no fuel can escape via the nozzle.

If the quantity of fuel in the ram pipe 13 (and in the return line 7) has reached an acceleration value prescribed by the control device 18 as a function of current engine operating conditions, the shut-off valve is closed, also under the control of the device 18, as a result of which the kinetic energy of the fuel flowing in the lines 13 and 14 is converted instantaneously into a quantity of pressure surge energy whose value is so high that the closing resistance of the nozzle 15 is overcome and fuel is ejected via the nozzle 15. This fuel injection device permits discontinuous operation of the piston pump, which pump, in conjunction with the electromagnetically actuated shut-off valve 6, permits the injection process to be controlled precisely.

These injection devices operating according to the energy storage principle are distinguished by injection pressures ≧40 bar, which pressures preferably lie in a region around 60 bar. With an injection pressure in the region of 60 bar, a fuel injection speed of approximately 50 m/s is achieved using conventional injection nozzles. The high injection pressures are produced in the form of pulses, the quantity of fuel injected per injection process being controlled by the length of the injection pulses.

In the method according to the invention, the time for the triggering or the start of the injection process is determined first. This can be done in a known manner by measuring a predetermined angular position of the crankshaft. When the predetermined angular position is detected, the injection procedure is triggered and at the same time a timer element is started, which after a predetermined time period, or a predetermined delay time, outputs a signal to ignite the fuel/air mixture in the combustion space.

While the timer element is measuring the predetermined delay time, the following processes take place in the fuel injection device:

1. the solenoid 21 is excited,
2. the armature 22 and the fuel contained in the ram pipe 13 are accelerated,
3. the stored energy is transmitted to the fuel located in the pressure line 14,
4. fuel is injected into the combustion space 4 when the closing resistance of the nozzle 15 has been overcome,
5. the injected fuel is atomized and eddied in the combustion space 4.

These processes which occur during the injection process are time-invariant, i.e. the time period is predetermined or depends on a few parameters such as the quantity of fuel injected per injection process, so that at the time when the injection process is triggered it is clear when the fuel injected into the combustion space 4 is in the ideal state for an ignition.

FIG. 1 illustrates a small fuel cloud 28 for idling mode and a large fuel cloud 29 for load mode. The ideal ignition time depends on how the entire fuel cloud is distributed in the combustion space 4 and whether a fuel/air mixture which is sufficiently rich for the ignition has become established in the region of a spark plug 30. The inventors have found that the time for an ideal ignition, in particular during idling, is obtained at a predetermined delay time with respect to the start of the injection process, which delay time is dependent on only a few parameters.

The two-stroke internal combustion engine to which the method according to the invention has been applied has been equipped for direct injection with cylinder heads 31 and pistons 32, as illustrated in FIGS. 4 and 5.

FIGS. 4 and 5 illustrate the pistons 32 in each case at the upper dead center, so that in each case a dome-shaped combustion space 4 is formed between the pistons 32 and the cylinder head 31. The fuel, which forms an injection cone 33 in the combustion space 4, is injected into this combustion space 4 using the injection nozzle 15.

In the embodiment according to FIG. 4, the spark plug touches the injection cone 33, so that the injected jet of fuel can be ignited directly. In this embodiment, both direct injection and also direct ignition thus take place, since the directly injected jet of fuel is ignited by the spark plug 30.

In the embodiment according to FIG. 5, the spark plug does not touch the injection cone 33. The injected fuel is reflected at the piston 32 and only afterwards ignited by the spark plug 30. In this embodiment therefore direct injection takes place, but no direct ignition.

Both embodiments are suitable for the time-delayed ignition according to the invention.

In the embodiment with the direct ignition, the predetermined time period of the delay time lies in the region between 0.5 milliseconds and 1 millisecond and during normal operation preferably assumes a value of 0.7 milliseconds. The delay time is varied here preferably as a function of the temperature of the internal combustion engine, the temperature being measured at the cylinder head 31. In the case of a cold start, the delay time is set at approximately 0.5 milliseconds, and in the case of a hot cylinder head 31 to 1 milliseconds. Further parameters for the setting of the delay time between the start of the injection process and the ignition time are not taken into account. Such a method of controlling the ignition time can be carried out easily and with little computational outlay, since the suitable delay time is determined only as a function of a single parameter, the cylinder head temperature.

With this embodiment, sensational synchronism in idling mode was achieved so that the two-stroke internal combustion engine idles smoothly even at a rotational speed of 180 rpm. This lower rotational-speed limit of 180 rpm was prescribed merely by the control device used in the tests, since it is not capable of calculating any slower rotational speeds.

Idling at a rotational speed of 180 rpm signifies a considerable saving in fuel in comparison with customary idling speeds which are a multiple of the idling speed achieved here.

A very high degree of smoothness of running was also achieved with the embodiment according to FIG. 5 in which the fuel is reflected at the piston 32. Owing to the reflection of the fuel, the delay time is longer than in the case of direct ignition, the delay time lying approximately in the region between 3.5 milliseconds and 5.5 milliseconds. It has become apparent that the delay time can be set to a single constant value which lies preferably at approximately 4.5 milliseconds. Such a constant delay time can be realized with very simple technical means, it being unnecessary to use a microprocessor to do this.

The timer element can be realized both as a digital timer and as a simple hardware circuit (FIG. 6).

The hardware circuit is designed for a two-cylinder internal combustion engine with in each case one input a, b to which the trigger or control signal for the injection process is applied. A control voltage which determines the delay time is applied to another input c. Given a constant delay time, the control voltage can be tapped at a potentiometer, and given a varying delay time the control voltage is supplied by the control device.

A positive rising edge of one of the trigger signals present at a, b switches a flip-flop 41, as a result of which the output Q of the flip-flop is energized. As a result, the output of a comparator 42 is opened, so that a capacitor 43 is charged via a resistor 44. The voltage present at the capacitor 43 is compared with a control voltage present at a corresponding capacitor 45. If the voltages are of equal magnitude, the flip-flop 41 is reset, as a result of which a control signal for the ignition is output at A, B.

The method according to the invention for controlling the ignition time can also be combined with a conventional method for controlling the ignition time in which the ignition time is determined as a function of a predetermined angular position of the crankshaft. Here, the method according to the invention is preferably applied below a load threshold or rotational speed threshold and the conventional method above this threshold. Such a rotational speed threshold lies approximately in the region between 2000 and 4000 rpm.

In summary, it is noted that with the method of delayed ignition according to the invention it is possible to determine the ignition time using simple technical means, excellent smoothness of running, particularly when idling, being achieved.

What is claimed is:

1. A method for controlling the ignition in a two-stroke internal combustion engine having a high-pressure injection device for injecting fuel into a combustion space of the internal combustion engine at injection pressures greater than 40 bar, the fuel being directly injected into the combustion space and mixing with the air located therein to form a fuel/air mixture, the method comprising the steps of:

determining an ignition time at which an ignition of the fuel/air mixture is carried out above a specific load threshold or rotational speed threshold by measuring a predetermined angular position of a crankshaft, and below the rotational speed threshold generating a control signal for the injection process starting a measurement of a predetermined delay time, expiry of which specifies an ignition time at which the control signal for ignition is output.

2. The method as claimed in claim 1, wherein the injection device is an injection device operating according to an energy storage principle.

3. The method as claimed in claim 2, wherein the injection device operates according to a solid-state energy storage principle.

4. The method as claimed in claim 1, wherein a time at which the injection process is started is determined by measuring a predetermined angular position of a crankshaft.

5. The method as claimed in claim 1, wherein the predetermined delay time is constant.

6. The method as claimed in claim 1, wherein the predetermined delay time is determined in accordance with one or more parameters, including cylinder head temperature and/or quantity of fuel injected per injection process.

7. The method as claimed in claim 1, wherein a fuel jet produced during injection is ignited directly.

8. The method as claimed in claim 7, wherein the predetermined delay time is between 0.5 ms to 1 ms.

9. The method as claimed in claim 8, wherein, after injection, fuel is reflected at a piston and after the reflection is ignited at the piston by a spark plug.

10. The method as claimed in claim 9, wherein the predetermined delay time is between 3.5 to 5.5 ms.

11. The method as claimed in claim 9, wherein fuel is reflected in a depression on the piston.

12. The method as claimed in claim 1, wherein a circuit is provided to measure the predetermined delay time, the circuit using the signal for starting the injection process as a trigger signal for measuring the predetermined delay time.

13. The method as claimed in claim 1, wherein the rotational speed threshold is between 2000 and 4000 rpm.

* * * * *